Aug. 31, 1965 J. E. PITTS, JR 3,204,032

APPARATUS FOR INDICATING THAT TELEPHONE CONVERSATION IS BEING RECORDED

Filed Sept. 27, 1961 2 Sheets-Sheet 1

INVENTOR
J. E. PITTS, JR.
BY Donald M Duft
ATTORNEY

INVENTOR
J. E. PITTS, JR.
BY Donald M. Duft
ATTORNEY

United States Patent Office 3,204,032

Patented Aug. 31, 1965

3,204,032

APPARATUS FOR INDICATING THAT TELEPHONE CONVERSATION IS BEING RECORDED

John E. Pitts, Jr., Redwood City, Calif., assignor to Bell Telephone Laboratories, Incorporated, New York, N.Y., a corporation of New York Filed Sept. 27, 1961, Ser. No. 141,153
12 Claims. (Cl. 179—6)

Figure 1:
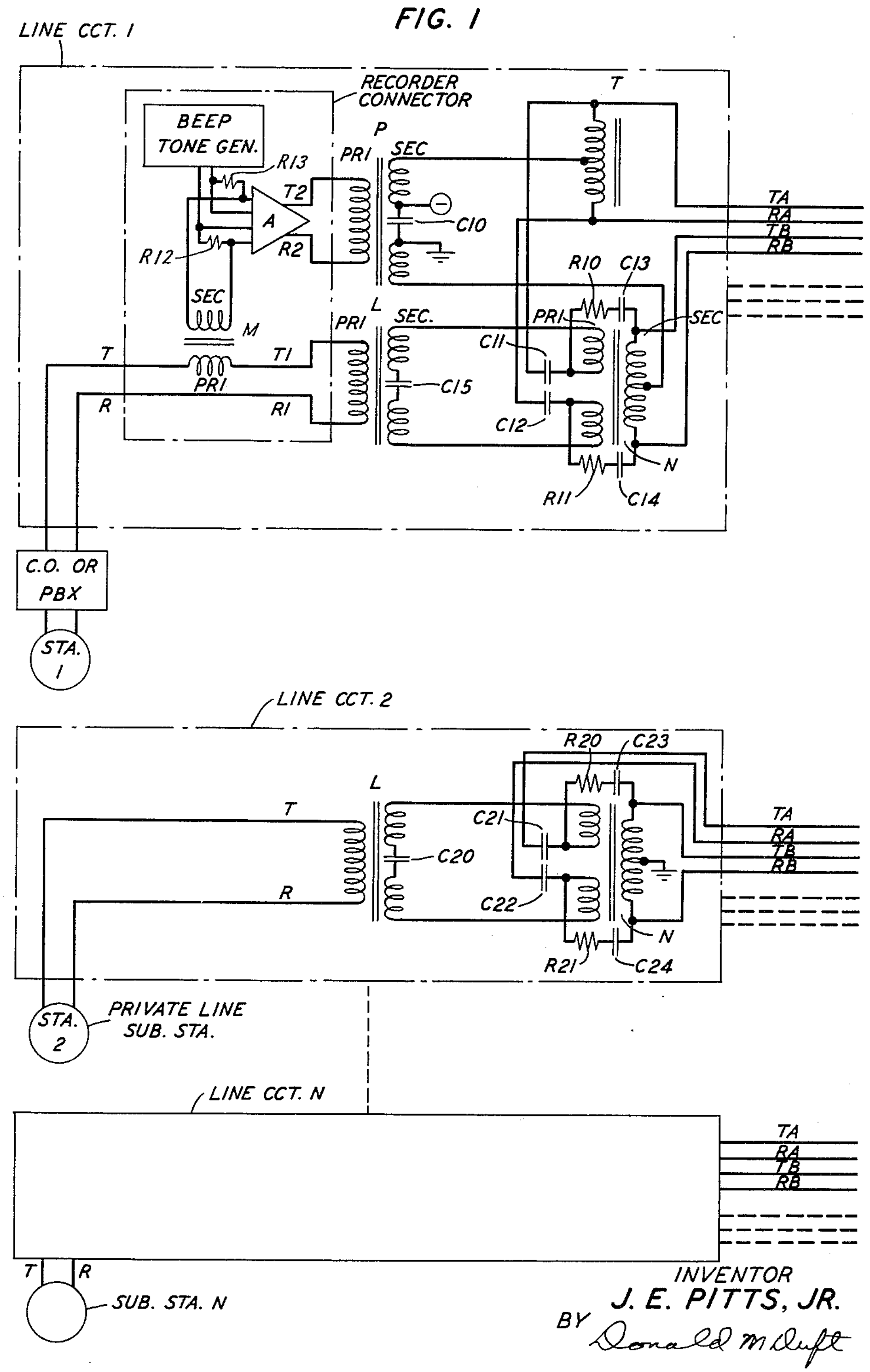

This invention relates to a recording control circuit and more specifically to a recording control circuit which facilitates the recording of calls served by private line telephone switching systems. Still more specifically, this invention relates to a private telephone system recording control circuit which automatically impresses a beep tone on those calls served by the private system which are either received from or extended to public telephone system subscriber stations.

It is common practice at the present time for organizations utilizing the services of private line telephone switching systems to record all calls in order that a permanent record thereof may be available for future reference. Present regulations concerning the recording of telephone calls require that a warning tone, frequently referred to as a beep tone, be superimposed on any call being recorded whenever the call is served, either in whole or in part, over public telephone system facilities. This beep tone requirement presents no problem in systems in which all calls are served over public telephone facilities since then the beep tone must be applied to the recording of each and every call. Also, this requirement presents no problem when all calls to be recorded are exclusively served by a private system. In this case, the beep tone is not used on any calls since there is no legal necessity for so doing.

The beep tone requirement complicates matters when it is desired to record calls served by a private line switching system where some but not all of the calls are served exclusively by the private system while others are served in part over public telephone facilities. To date, this problem has usually been solved by applying the beep tone to the recording of all calls. This is an undesirable solution since the beep tone generating equipment is sufficiently expensive so that it is economically undesirable to utilize it on calls for which there is no legal necessity for so doing. Another possible solution is to provide facilities for manually energizing the beep tone supply each time a call is recorded which is subject to the beep tone requirement. However, this solution is seldom, if ever, used since due to human error, the beep tone generator may not always be energized for the recording of calls on which it is required.

Accoridngly, it is an object of the invention to provide a recording control circuit which superimposes beep tones on calls served by a private line switching system only when the calls are extended to or received from a station in a public telephone system.

It is a further object of the invention to provide a recording control circuit which supplies beep tones for recording telephone conversations only when there is a legal necessity for so doing.

In accordance with the present invention, a private telephone system recording control circuit is provided which is operable to supply beep tones for recording purposes whenever the private system extends a call to or receives an incoming call from a public telephone system subscriber station. Conversely, the recording control circuit does not provide beep tones for calls completed exclusively within the private system. The control circuit includes equipment which monitors the beep tone generator output during the recording of calls requiring beep tones and which terminates the recording operation in the event the beep tone generator should become inoperative. However, in this event a path is maintained over which the calling and called parties may converse even though the recorder can no longer record the call.

The disclosed control circuit is shown as part of a private line telephone switching system having attendant positions and subscriber stations together with a switching network for interconnecting the various positions and stations. Facilities are also shown over which an attendant may either extend a call to or receive a call from a public telephone system subscriber station such as, for example, a central office or PBX station.

Each private line subscriber station and each circuit extending to the public system is served by a line circuit individual thereto. Each line circuit is connectable via the switching equipment to an attendant position by means of two simplex circuits comprising a phantom circuit. With this arrangement, as is common in the telephony art, each simplex comprises one side of the phantom. The pair of conductors comprising one simplex is connected to the transmitter at the attendant position and transmits the attendant's speech currents from the position circuit to the line circuit. The conductor pair comprising the other simplex is connected to the headset receiver at the position and transmits speech currents from the subscriber stations, via the line circuits, to the attendant's receiver. Each line circuit has a sidetone circuit so that a portion of the attendant's speech currents are applied to the conductors to which his receiver is connected. This permits the attendant to hear his own speech, as well as that of the party with which he is connected, in accordance with usual telephone practice.

Each attendant position includes a conventional recording mechanism and a switching mechanism which is operable to connect the input of the recorder either across the phantom or across the conductors of the phantom to which the attendant's headset receiver is connected. The normal condition of the switching mechanism is such that the recorder is normally effectively connected to the headset receiver conductors. The switching mechanism remains in its normal condition whenever the attendant is connected to a line circuit associated with a private system subscriber station. Therefore, on calls to and from such stations, the recorder is effectively connected to the attendant's headset receiver and records the same speech signals that are applied to the receiver.

Each line circuit serving a public system station applies a D.C. control potential to the center tap of one simplex of the phantom. The line circuits serving private system stations do not apply a D.C. control potential to the same simplex. The recorder switching mechanism at the attendant position includes a relay whose winding is connected to the center tap of the side of the phantom to which the control potential is applied by the public system line circuits. Thus, this relay operates from the applied control potential to transfer the input of the recorder from the headset receiver to the phantom whenever an attendant position is connected to a public system line circuit. Conversely, the relay does not operate whenever a position is connected to a private station line circuit and the recorder remains effectively connected to the headset receiver at such times.

Each public system line circuit includes a beep tone generator together with mixing equipment for applying beep tones as well as speech from both sides of a call to the phantom circuit. This speech plus beep signal is transmitted over the phantom to the connected attendant position where it is applied to the input of the recorder which, as has already been mentioned, is connected across the phantom at this time. The recorder thereby records the conversation of both parties together with the legally required beep tone for such calls.

Each line circuit having the beep tone equipment also contains the necessary equipment to block the speech signals from the phantom in the event the beep tone generator thereat should become inoperative. This, in turn, prevents the recorder from recording the call as long as the beep tone equipment is inoperative. However, the speech signals are still applied to both conductor pairs of the phantom as before and therefore, the attendant and the subscriber may continue their conversation even though the conversation is no longer being recorded.

The foregoing represents an ideal arrangement whereby calls served exclusively by a private line system may be recorded without beep tone while calls extended to or incoming from a public system are automatically recorded with the beep tone. It is also advantageous in that it does not require the provision of any extra conductors to those already available for interconnecting the line circuits and the positions.

A feature of the invention is the provision of a recording control circuit for use in a private line telephone switching system which is operative to supply beep tones on the recording of those calls served by the system which are also served in part over public telephone system facilities.

A further feature of the invention comprises the provision of a private line switching system having subscriber stations and attendant positions together with equipment for automatically superimposing a legally required beep tone on the recording of calls served by a position which are also served in part over public telephone facilities.

A further feature of the invention comprises a recording control circuit for use in a private line telephone switching system which applies beep tones to the recording of calls where such tones are legally required and which, in the event the beep tone generating facilities become inoperative, prevents further recording of such calls but yet permits the interconnected parties to continue their conversations.

Figure 2:
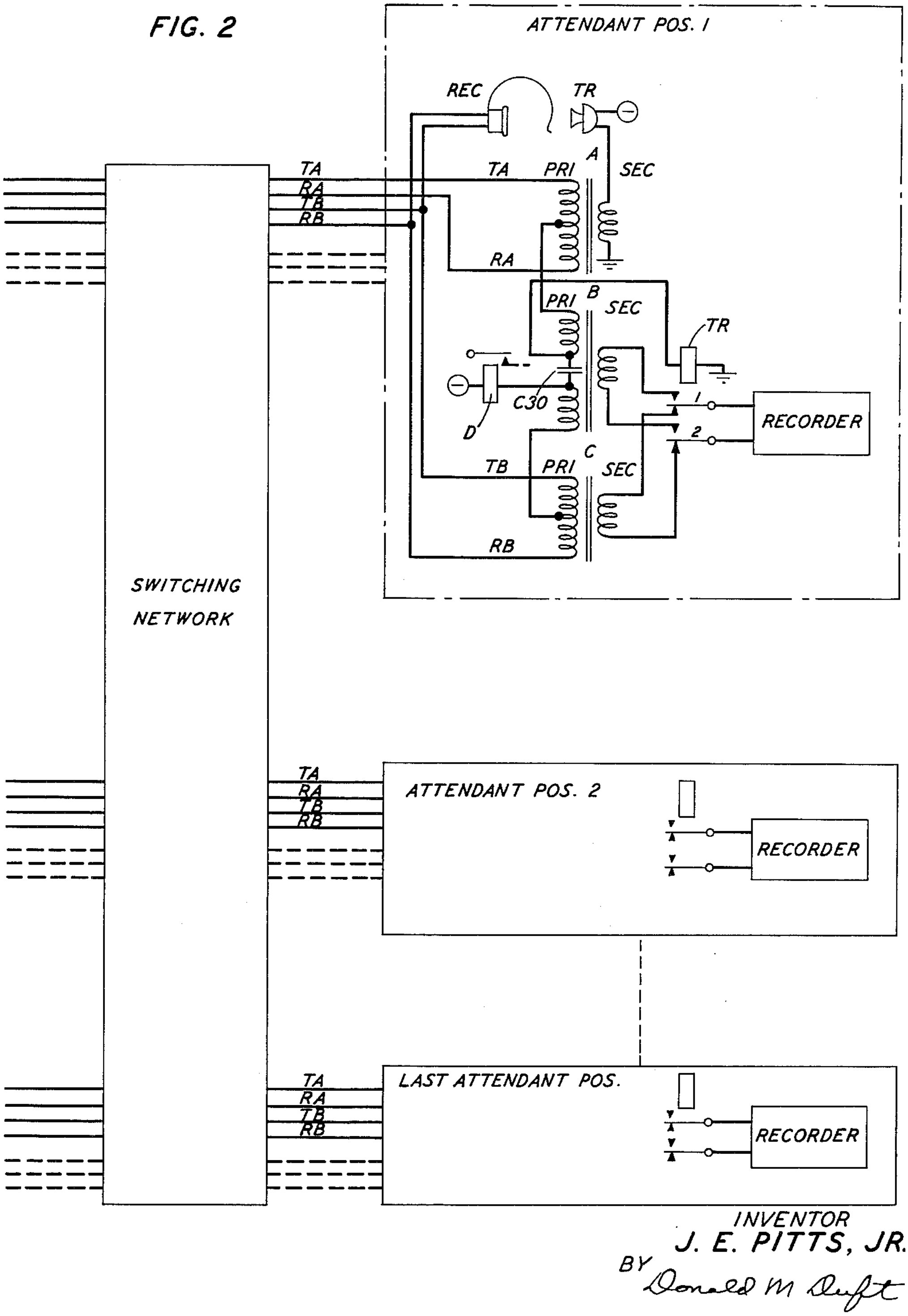

These and other objects and features of the invention will become apparent from a reading of the following description taken in conjunction with the drawings in which:

FIGS. 1 and 2, when FIG. 1 is placed to the left of FIG. 2, together disclose the circuit of an exemplary embodiment of the present invention.

The drawings disclose the present invention as a part of a private line switching system having subscriber stations, line circuits, attendant positions, and a switching network operable to interconnect the various positions and stations. They also disclose a central office or PBX station which comprises a portion of a public telephone system and which may be interconnected by means of the same private system switching network to and attendant position. The details of the switching network are of no importance to the present invention and it may comprise any type of well known prior art switching arrangement such as for example, a step-by-step or a crossbar switching system.

The disclosed arrangement of attendant positions, the switching network, the line circuits and the subscriber stations may constitute a private line common control key type switching system of the type shown in detail in the copending application of Allen et al. Serial No. 141,178 filed on September 27, 1961. The Allen et al. application discloses a switching system having the aforementioned elements in which calls may be made by an attendant to any subscriber stations, by certain subscriber stations to any attendant position, and by other subscriber stations to only a single attendant position. Also, as is fully describer in Allen et al., some of the calls are limited to the confines of the private system while others are either directed to or received from a public system subscriber station.

The present invention is shown as comprising a portion of the Allen et al. system only in order to facilitate its understanding. However, it is to be understood that the invention may be utilized in any private line switching system which has occasion to interchange calls with subscribers in public telephone systems. Accordingly, when used in other systems, the equipment shown generally as attendant positions on the present drawings may comprise other equipment such as for example operator positions, or subscriber stations.

FIG. 1 discloses a plurality of line circuits, two of which are shown in some detail while the rest are shown only diagrammatically. Line circuit 1 is operable to extend calls to or receive calls from a subscriber station in a public telephone network such as for example, subscriber station 1 which may be a conventional central office or PBX station. Line circuit 2 serves subscriber station 2 which is one of the stations in the private line system.

Additional line circuits may be provided as needed depending upon the number of subscribers stations to be served. The number of line circuits of each type to be provided will depend upon the number of calls completed over public system facilities compared to those completed solely within the private system. Accordingly, the details of line circuit N will depend upon whether station N is of the private or public type.

FIG. 2 discloses a plurality of attendant positions with position 1 being shown in some detail and with the remaining positions being shown only diagrammatically. Also disclosed on FIG. 2 is a switching network, shown diagrammatically, which functions to interconnect the attendant positions and line circuits in the manner disclosed in the aforementioned Allen et al. application. Each attendant position and each line circuit is connected to the switching network by a plurality of conductors including four designated TA, RA, TB and RB.

It is to be understood that FIG. 1 discloses only the details of the line circuits as are necessary for an understanding of the present invention. Actually, in its commercial embodiment each line circuit 2 could comprise many forms, such as for example, a line circuit having automatic ringing facilities, a line circuit requiring manual ringing, a local line circuit, a toll line circuit, et cetera, depending upon the details of the station to be served. The present drawings disclose only those details of the position circuits and the line circuits which are necessary for an understanding of the present invention. Not shown on the drawings are the circuit details and equipment pertaining to the control of the switching network's operation. These are not disclosed since they comprise no portion of the present invention and since the details thereof would depend entirely upon the nature of the switching system in which the present invention would be used.

Referring now to FIG. 2 each attendant position includes a headset transmitter designated TR and a headset receiver designated REC. The transmitter is effectively connected signalwise, by means of transformer A, with the conductor pair TA and RA which transmits the attendant's speech currents from the position to the line circuit with which the position is connected on a call. The headset receiver is connected to the conductor pair TB and RB over which speech currents are received representing both sides of a call as is later described. The primary of transformer C is also connected across conductors TB and RB and therefore the same speech signals appearing on these conductors are developed across the secondary of the transformer.

The upper terminal of the top primary of transformer B is connected by means of the primary of transformer A to the center of the simplex comprising conductors TA and RA. The bottom terminal of the lower primary of transformer B is connected by means of the primary of transformer C to the center tap of the simplex comprising conductors TB and RB. The inner terminals of the upper and lower primary windings of transformer B are connected to the windings or relays TR and D respectively. Capacitor C30 conects the two primary windings of transformer B signalwise. Thus, the primary of transformer B is effectively across the phantom circuit whose one side comprises simplex conductors TA and RA and whose other side comprises simplex conductors TB and RB. As is explained in detail hereinafter, the line circuits serving public telephone facilities apply to the phantom circuit beep tone plus the speech currents for both sides of the calls served by these line circuits. These same beep plus speech signals are therefore applied over the phantom circuit to the primary of transformer B.

Each attendant position also includes a recorder which is connectable by means of contacts on relay TR with either the secondary of transformer C or the secondary of transformer B. The normal condition of the circuit is such that relay TR is released so that the recorder is connected to the secondary of transformer C and records the same speech signals that are applied to the attendant's headset receiver. The operation of relay TR transfers the recorder from the secondary of transformer C to the secondary of transformer B so that the recorder records the speech plus beep signal applied to transformer B by the phantom circuit.

Referring now to line circuit 1 on FIG. 1, it contains facilities for applying the speech currents received from the subscriber at station 1 to the conductor pair TB and RB, for applying the attendant's speech currents received over conductor pair TA and RA to the trunk extending to sugscriber station 1, for applying a portion of the attendant's speech currents received over conductors TA and RA to conductors TB and RB in order that the attendant may hear both sides of the calls in his receiver, and for applying signals from both sides of the calls together with beep tones to the phantom circuit comprising the TA and RA simplex and the TB and RB simplex.

The speech currents from subscriber station 1 are received over conductors T and R. From there they pass through the primary of transformer M and over conductors T1 and R1 to the primary of transformer L. These same currents are developed in the two secondaries of transformer L, which are connected signalwise by capacitor C15, and from there are applied to the primary of transformer N. Transformer N together with its associated circuitry comprises a two-to-four wire conversion arrangement, well known in the telephony art, whereby the speech currents received from station 1 over the conductor pair T and R are applied to conductors TB and RB and whereby the attendant's speech currents on conductors TA and RA are applied to conductors T and R. Resistors R10 and R11 together with capacitors C13 and C14 comprise a sidetone path whereby a portion of the attendant's speech currents on conductors TA and RA are applied to conductors TB and RB extending to the attendant's headset receiver.

The flow of speech currents through the primary of transformer M, which speech currents represent both sides of the conversation for calls served by this line circuit, induce corresponding currents in the secondary of the transformer which, in turn, are applied to one input of the amplifier. The output of the beep tone generator is applied to a second input of the amplifier. Also, the beep tone is applied via resistors R12 and R13 to transformer M so that both parties will hear the tone and know that the call is being recorded. The amplifier mixes the signals applied to its two inputs and applies the resultant speech plus beep signals over conductors T2 and R2 to the primary of transformer P. Corresponding speech plus beep signals are developed in the secondary of transformer P. The upper terminal of this winding is connected by means of inductor T to the center tap of the simplex comprising conductors TA and RA. The lower terminal of the winding is connected by means of the secondary of transformer N to the simplex comprising conductors TB and RB. Accordingly, the speech plus beep signals developed in the secondary of transformer P are transmitted over the phantom circuit and applied to the primary of transformer B in the attendant position.

The circuitry of the amplifier includes an AND circuit together with other circuitry whereby no signal appears on its output conductors T2 and R2 if beep tone signals are not received from the beep tone generator at the required rate and amplitude. This prevents the speech signals applied to the input of the amplifier by the secondary of transformer M from appearing on the output of the amplifier whenever the beep tone generator is inoperative. Accordingly, speech signals are applied over the phantom to the primary of transformer B in the attendant poistion only so long as the beep tone generator is operative.

Line circuit 2, which serves subscriber station 2 comprising a portion of the private line switching system, differs from line circuit 1, insofar as the present invention is concerned, only in that it does not have the facilities for applying the beep plus speech signals to the phantom circuit. Consequently, it does not contain a transformer M, a beep tone generator, an amplifier, a transformer P, or an inductance T, all of which elements comprise the facilities for generating the beep plus speech signals and for applying them to the phantom circuit as described in connection with line circuit 1. Transformer L in line circuit 2 together with transformer N and its associated circuitry, in a manner similar to that already described for ilne circuit 1, provide a two-to-four wire conversion arrangement for interconnecting the conductor pair T and R extending to station 2 with the four conductors TA, RA, B and RB extending via the switching network to any attendant position with which line circuit 2 may be interconnected on a call.

The interconnection of attendant position 1 with line circuit 1 on a call completes the following path to operate relay TR: ground, the winding of relay TR, the top primary winding of transformer B, the primary winding of transformer A, the simplex conductors TA and RA extending through the switching network to inductor in line circuit 1, the top secondary winding of transformer P, to negative battery on the inner terminal of the same winding. Relay D in position 1 also operates at this time over the following circuit: negative battery, the winding of the relay, the lower primary of transformer B, the primary of transformer C, the simplex conductor TB and RB extending through the switching network to the secondary of the transformer N of line circuit 1, the lower secondary of transformer P to ground.

The operation of relay TR transfers the recorder from the secondary of transformer C to the secondary of transformer B whereby it records both sides of the call together with the beep tone superimposed thereon by the circuitry of line circuit 1 as already described. The recording of the call continues so long as the beep tone circuitry remains operative. In the event that it should become inoperative, the speech currents are removed from the phantom to block further recording of the call. However, it should be noted that the transmission paths associated with the attendant's headset transmitter and receiver are unaffected by the cessation of the recording and thus the attendant and the subscriber at station 1 may continue their conversation even though the call is no longer being recorded.

The operation of relay D performs no useful function insofar as the present invention is concerned. However, as is fully described in the Allen et al. application, the operation of this relay performs certain signaling and switching functions concomitant to the attendant position circuit being connected to a line circuit.

The interconnection of attendant position 1 with line circuit 2 on a call does not operate relay TR in the position circuit since line circuit 2 makes no provision for applying negative battery to the center tap of the TA and RA simplex, as does line circuit 1. Thus, relay TR in the position circuit remains unoperated whenever its associated position is connected to line circuit 2. This causes the input of the recorder to remain connected to the secondary of transformer C whereby it records the same speech currents applied to the attendant's receiver. A circuit is also closed at this time which is identical to that already described for FIG. 1 to operate relay D in the position circuit thereby signifying that the position is currently connected to a line circuit.

It is to be understood that the above-described arrangements are but illustrative of the application of the principles of the invention. Numerous other arrangements may be devised by those skilled in the art without departing from the spirit and scope of the invention.

What is claimed is:

1. In combination, an atendant position, a private line subscriber station, a public telephone system subscriber station, a switching system selectively operable to interconnect said position with any selected one of said stations, recording means automatically operable to record all calls served by said position, and automatic means effective upon the interconnection of said position with any station for impressing beep tones on only the calls between said position and said public station.

2. In combination, an attendant position, a private line subscriber station, a public telephone system subscriber station, a switching system selectively operable to interconnect said position with any selected one of said stations, recording means automatically operable to record all calls served by said position, means effective upon the interconnection of said position with any station for impressing beep tones on only the calls between said position and said public station, and means for terminating the recording of any call between said position and said public station in the event the beep tone impressing means should become inoperative.

3. In combination, an attendant position, a private line subscriber station, a public telephone system subscriber station, a switching system selectively operable to interconnect said position with any selected one of said stations, recording means automatically operable to record all calls served by said position, means effective upon the interconnection of said position with any station for impressing beep tones on only the calls between said position and said public station, means for terminating the recording of any call between said position and said public station in the event the beep tone impressing means should become inoperative, and means whereby said position and said public station remain interconnected on a call even though the call is no longer being recorded due to the inoperative condition of said beep tone means.

4. In combination, an attendant position, a private line subscriber station, a public telephone system subscriber station, a switching system selectively operable to interconnect said position with any selected one of said stations, a recorder at said position operable to record all calls served by its position, and means responsive to an interconnection of said position with a subscriber station for impressing beep tones on only the calls between said position and said public station.

5. In combination, an attendant position, a private line subscriber station, a public telephone system subscriber station, a switching system selectively operable to interconnect said position with any selected one of said stations, a recorder at said position operable to record all calls served by its position, means responsive to an interconnection of said position with a subscriber station for impressing beep tones on only the calls between said position and said public station, and means for terminating the recording of any call between said position and said public station in the event the beep tone impressing means should become inoperative.

6. In combination, an attendant position, a private line subscriber station, a public telephone system subscriber station, a switching system selectively operable to interconnect said position with any selected one of said stations, a recorder at said position operable to record all calls served by its position, means responsive to an interconnection of said position with a subscriber station for impressing beep tones on only the calls between said position and said public station, means for terminating the recording of any call between said position and said public station in the event the beep tone impressing means should become inoperative, and means whereby the said position and said public station remain interconnected on a call even though the call is no longer being recorded due to the inoperative condition of said beep tone means.

7. In combination, an attendant position, a private line subscriber station, a public telephone system subscriber station, a line circuit for each station and connected thereto, a switching system selectively operable to interconnect said position with the line circuit for any selected one of said stations, a recorder at said position operable to record all calls served by its position, a beep tone generator in the line circuit for said public station, and means responsive to an interconnection of said position with a subscriber station for impressing beep tones on only the calls between said position and said public station.

8. In combination, an attendant position, a private line subscriber station, a public telephone system subscriber station, a line circuit for each station and connected thereto, a switching system selectively operable to interconnect said position with the line circuit for any selected one of said stations, a recorder at said position operable to record all calls served by its position, a beep tone generator in the line circuit for said public station, means responsive to an interconnection of said position with a subscriber station for impressing beep tones on only the calls between said position and said public station, and means for terminating the recording of any call between said position and said public station in the event said beep tone generator should become inoperative.

9. In combination, an attendant position, a private line subscriber station, a public telephone system subscriber station, a line circuit for each station and connected thereto, a switching system selectively operable to interconnect said position with the line circuit for any selected one of said stations, a recorder at said position operable to record all calls served by its position, a beep tone generator in the line circuit for said public stations, means partially at said position and partially at said public station line circuit and responsive to an interconnection of said position with a subscriber station for impressing beep tones on only the calls between said position and said public station, means at said public station line circuit for terminating the recording of any call between said position and said public station in the event the beep tone generator should become inoperative, and means whereby said position and said public station remain interconnected on a call even though the call is no longer being recorded due to the inoperative condition of said beep tone generator.

10. In combination, an attendant position, private line subscriber stations, public subscriber stations, a plurality of line circuits each of which is individually associated with one of said stations, a switching network, a phantom circuit having a first and a second simplex circuit for interconnecting said position with any line circuit by means of said switching network, a transmitter at said position, means for connecting said transmitter to said first simplex whereby said first simplex transmits speech currents from said attendant position to a connected line circuit, a receiver at said attendant position, means for connecting said receiver to said second simplex whereby speech currents may be transmitted from the connected line circuit over said second simplex to said receiver, a relay at said position having a winding connected between a center tap of said first simplex and a common ground, a recorder at said position normally connected to said second simplex, contacts on said relay responsive to the operation of said relay to transfer said recorder from said second simplex to center taps of said first and second simplexes in a phantom circuit connection, means in each line circuit for applying speech currents from its associated subscriber station to said second simplex, means in each line circuit for applying the speech currents received from the transmitter at said position over said first simplex to its associated subscriber station, a beep tone generator in each line circuit serving a public station, means in each line circuit serving a public station for impressing beep tones plus speech currents representing both sides of all calls served by said line circuit to center taps of said first and second simplexes in a phantom circuit arrangement, means for applying a D.C. potential to the center tap of said first simplex at each line circuit serving a public subscriber station for operating the relay in said attendant position whenever said position is interconnected with said last-named line circuit.

11. The combination recited in claim 10 together with means in each line circuit serving a public station for preventing the application of speech currents to said phantom whenever said beep tone generator becomes inoperative.

12. In combination, an attendant position, a private line subscriber station, a public telephone system subscriber station, a line circuit for each station and connected thereto, a switching system selectively operable to interconnect said position with the line circuit for any one of said stations, a recorder at said position operable to record all calls served by its position, a beep tone generator and an amplifier in the line circuit for said public station, said amplifier having a beep tone input and a speech current input, means for connecting the output of said beep tone generator to said amplifier beep tone input, means for connecting speech currents of calls over said public station line circuit to said amplifier speech input, means including the output circuit of said amplifier for impressing beep tones on the recording of only calls between said position and said public station, means including said amplifier for terminating the recording of any call between said position and said public station in the event he beep tone generator becomes inoperative, and means whereby said attendant position and said public station remain interconnected on a call even though the call is no longer being recorded due to the inoperative condition of said beep tone generator.

References Cited by the Examiner

UNITED STATES PATENTS 2,528,459 10/50 Thompson ---------------- 179—6

RVING L. SRAGOW, *Primary Examiner.*

BERNARD KONICK, *Examiner.*